United States Patent

Mita et al.

Patent Number: 5,940,385
Date of Patent: Aug. 17, 1999

[54] MULTICELLULAR TRANSMISSION METHOD AND APPARATUS

[75] Inventors: Yasuhiro Mita, Kokubunji; Masami Yabusaki, Iruma; Narumi Umeda, Yokohama, all of Japan

[73] Assignee: NTT Mobile Communications Network, Inc., Japan

[21] Appl. No.: 08/732,411

[22] PCT Filed: Feb. 23, 1996

[86] PCT No.: PCT/JP96/00420

§ 371 Date: Oct. 22, 1996

§ 102(e) Date: Oct. 22, 1996

[87] PCT Pub. No.: WO96/26589

PCT Pub. Date: Aug. 29, 1996

[30] Foreign Application Priority Data

Feb. 23, 1995 [JP] Japan ................................. 7/35734

[51] Int. Cl.[6] .................................................. H04J 3/24
[52] U.S. Cl. ........................ 370/349; 370/389; 370/402; 370/474; 370/476
[58] Field of Search .................................. 370/349, 231, 370/232, 337, 347, 402, 403, 412, 468, 474, 476, 389, 394, 395

[56] References Cited

U.S. PATENT DOCUMENTS

| 5,282,202 | 1/1994 | Bernstein et al. | 370/468 |
|---|---|---|---|
| 5,313,454 | 5/1994 | Bustini et al. | 370/231 |
| 5,590,133 | 12/1996 | Billström et al. | 370/349 |
| 5,633,861 | 5/1997 | Hanson et al. | 370/412 |

FOREIGN PATENT DOCUMENTS

| 61-500883 | 5/1986 | Japan | H04L 11/20 |
|---|---|---|---|
| 64-42951 | 2/1989 | Japan | H04L 11/00 |
| 2-166856 | 6/1990 | Japan | H04L 11/20 |
| 2-214243 | 8/1990 | Japan | H04L 12/48 |
| 2-252341 | 10/1990 | Japan | H04L 12/56 |
| 3-280644 | 12/1991 | Japan | H04L 12/56 |
| 4-223635 | 8/1992 | Japan | H04L 12/56 |
| 6-335079 | 12/1994 | Japan | H04Q 11/04 |
| 7-245628 | 9/1995 | Japan | H04L 12/56 |

OTHER PUBLICATIONS

IEICE Technical Research Report, SSE95–115 IEICE, Takashi Joho, Yasushi Hibino "Proposal of the Packet Train Exchange System and Performance Evaluation by Simulation" pp. 37–42, Nov. 17, 1995.

IEICE, SSE91–80 IEICE, Masashi Ohno, Tatsuo Mochinaga "A Study of Band Management in Facility ATM" pp. 49–54, Sep. 18, 1991.

NTT R & D, vol. 40, No. 10, 1991 NTT, Takemi Arita and others, Oct. 10, 1991.

*Primary Examiner*—Dang Ton
*Assistant Examiner*—Shick Hom

[57] ABSTRACT

A multicellular transmission apparatus in a mobile communication network, capable of preventing delay involved in reassembling short packets into fixed length packets (ATM cells), degradation of communication signals due to the delay, and reduction of the transmission efficiency involved in assembling the short packets into the fixed length packets. When low speed information transmitted from a telephone set is converted into short packets by communication data assemblers/disassemblers in a mobile gateway switching center, followed by multiplexing of the short packets into the fixed length packets by fixed length packet assemblers/disassemblers, the short packets sent from a plurality of telephone sets are grouped for each destination node (a particular radio base station, for example) in the network, and are multiplexed into the fixed length packets belonging to the group bound for the destination of the short packets. This obviates the disassembling/reassembling of the fixed length packets at intermediate switching centers, thereby implementing an effective ATM switching system.

17 Claims, 12 Drawing Sheets

*"GROUP" REFERS TO ROUTING INFORMATION GROUP BOUND FOR THE SAME DESTINATION

MULTICELLULAR TRANSMISSION METHOD AND APPARATUS

TECHNICAL FIELD

The present invention relates to a multicellular transmission method which assembles data sent from a plurality of communication terminals into fixed length packets, and transfers them to other nodes in a network, and more particularly to a multicellular transmission method and apparatus capable of reducing the delay and degradation of signals involved in assembling the fixed length packets.

BACKGROUND ART

Figure 1:
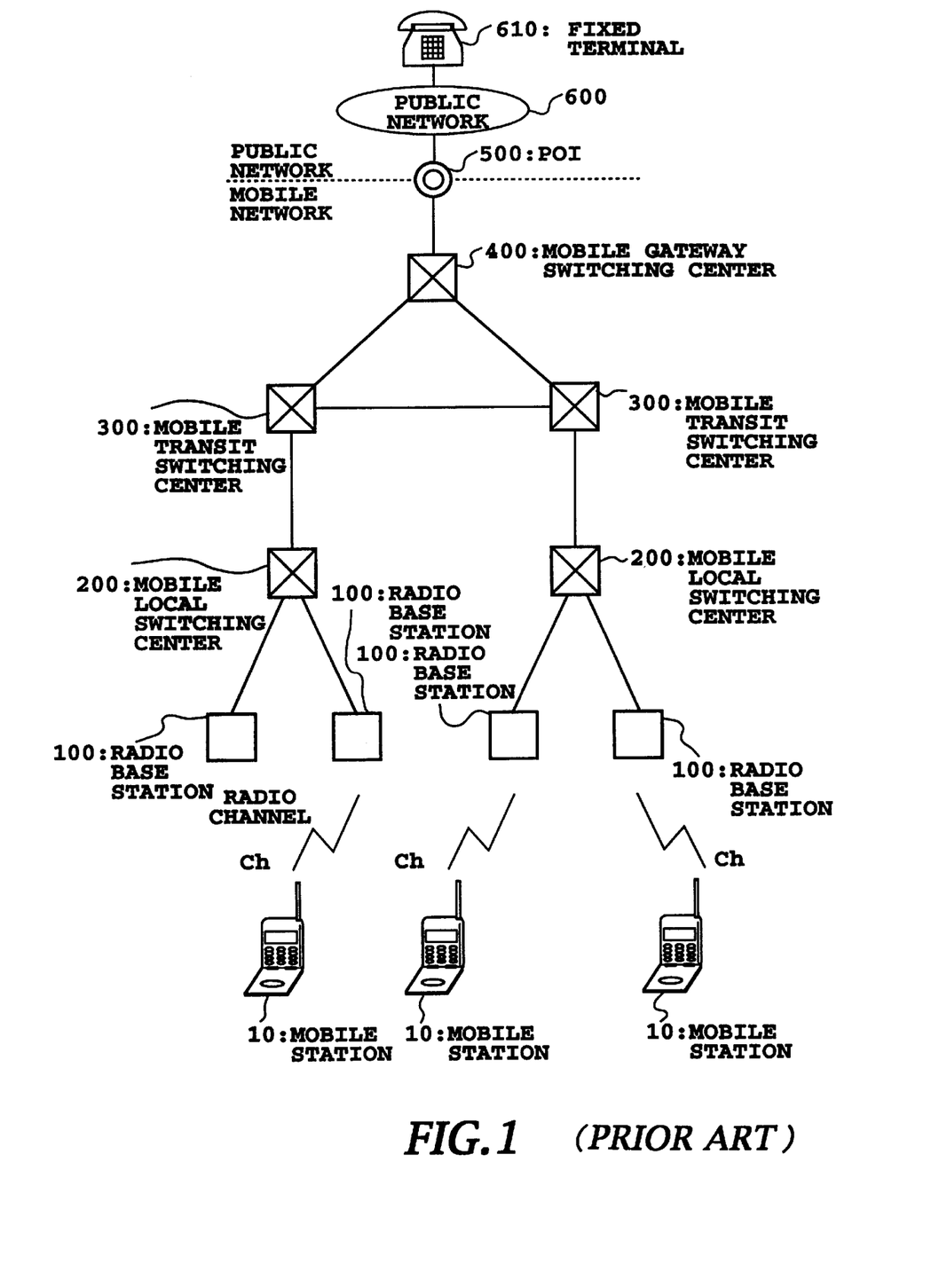
FIG. 1 is a block diagram showing an example of a mobile communication network.

FIG. 1 is a block diagram showing a conventional mobile communication network. A signal output from a mobile terminal 10 is received by a radio base station 100 through a radio channel ch. The corresponding signal output from the radio base station 100 is sent to a destination fixed terminal (telephone set) 610 in a public network through a mobile local switching center 200, a mobile transit switching center 300, a mobile gateway switching center 400 and a point of interference (POI) 500 which connects the public network and the mobile communication network. The nodes from the radio base station to the mobile gateway switching center 400 are termed mobile intra-network nodes, or simply intra-network nodes in this specification. Similar intra-network nodes are provided in the public network.

Communications between these intra-network nodes are carried out by exchanging fixed length packets. As a communication method using the fixed length packets, ATM (Asynchronous Transfer Mode) is established as an international standard.

Figure 2A:
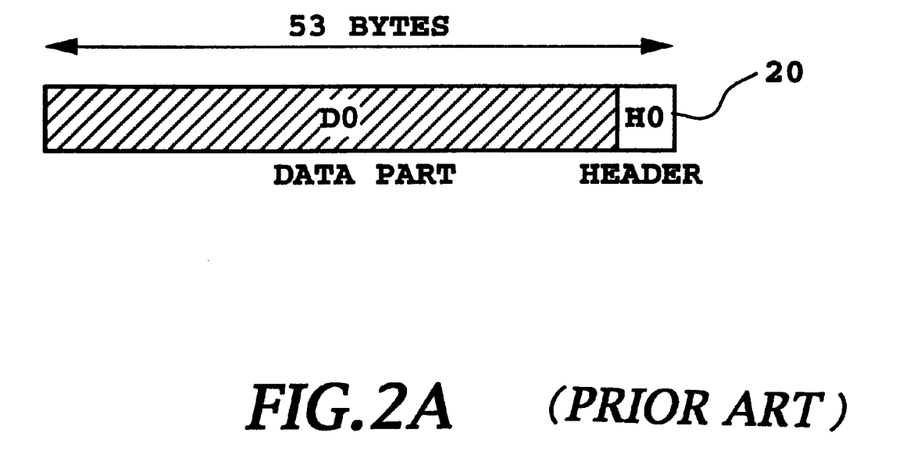
FIG. 2A is a schematic diagram illustrating the structure of a fixed length packet (ATM cell)

FIG. 2A is a schematic diagram showing the structure of the fixed length packet used by an ATM system. The ATM system generates a 53-byte fixed length packet 20, called an ATM cell, by dividing data to be transferred and by adding a header H0 including routing information. The fixed length packet is used between the intra-network nodes (see, for example, Hideyoshi Tominaga, et al. "Simple B-ISDN technology", edited by The New ITU Association of Japan, or ITU-RECOMMENDATION I.150).

When applying the ATM architecture to a mobile communication system, information to be transmitted is compressed as much as possible to effectively use radio channels. For example, a voice signal is compressed with a CODEC to 4–8 kbps, which is much lower than 64 kbps, the fundamental transmission rate of a fixed network. Accordingly, low speed data will cause a rather long delay time (cellularizing delay time) in comparison with that of the public network when the data is simply converted into the ATM cell. This poses a problem in that it results in an increase of the delay of information transmission, and a degradation of communication quality.

Figure 2B:
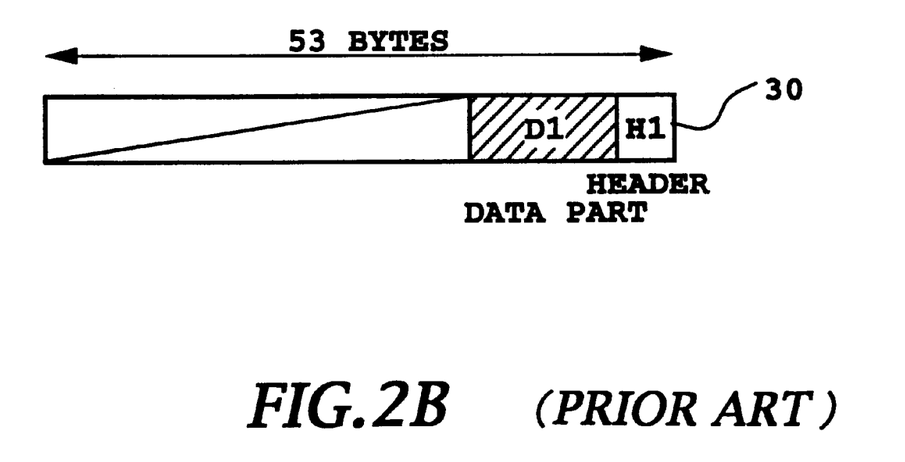
FIG. 2B is a schematic diagram illustrating the structure of the fixed length packet (partial cell) including a blank.

FIG. 2B is a schematic diagram illustrating a partial cell 30, the ATM cell which includes a smaller amount of data to limit the cellularizing delay time. Using this partial cell (a fixed length packet) 30 makes it possible to eliminate the problem involved in the cellularizing time. This, however, presents a new problem in that it results in a blank in the cell, and the data transmission is not carried out during the blank, which reduces the transmission efficiency.

To solve this problem, the assignee of the present application proposed Japanese Patent Application No. 6-1368, "A mobile radio communication system" (U.S. patent application Ser. No. 08/371,547). It discloses a method and apparatus for multiplexing a plurality of short packets into a single ATM cell. Here, a short packet refers to a packet whose length is shorter than the data part of the ATM cell.

This prior art system, however, has the following drawback. For example, when the mobile gateway switching center 400 transfers a plurality of short packets to the radio base station after multiplexing them into a single fixed length packet, the fixed length packet must be disassembled and assembled again in both the mobile transit switching center 300 and the mobile local switching center 200, through which the packet passes. This is because each center carries out multiplexing by only considering the next center, regardless of whether the fixed length packets are bound for the same or different radio base stations. This will also present a problem in that it causes the delay at individual centers, and the degradation of communication quality.

Furthermore, the prior art system multiplexes the low speed information from a set of communication terminals into only a predetermined ATM cell. This presents the following problems, which will be described below.

Figure 3:
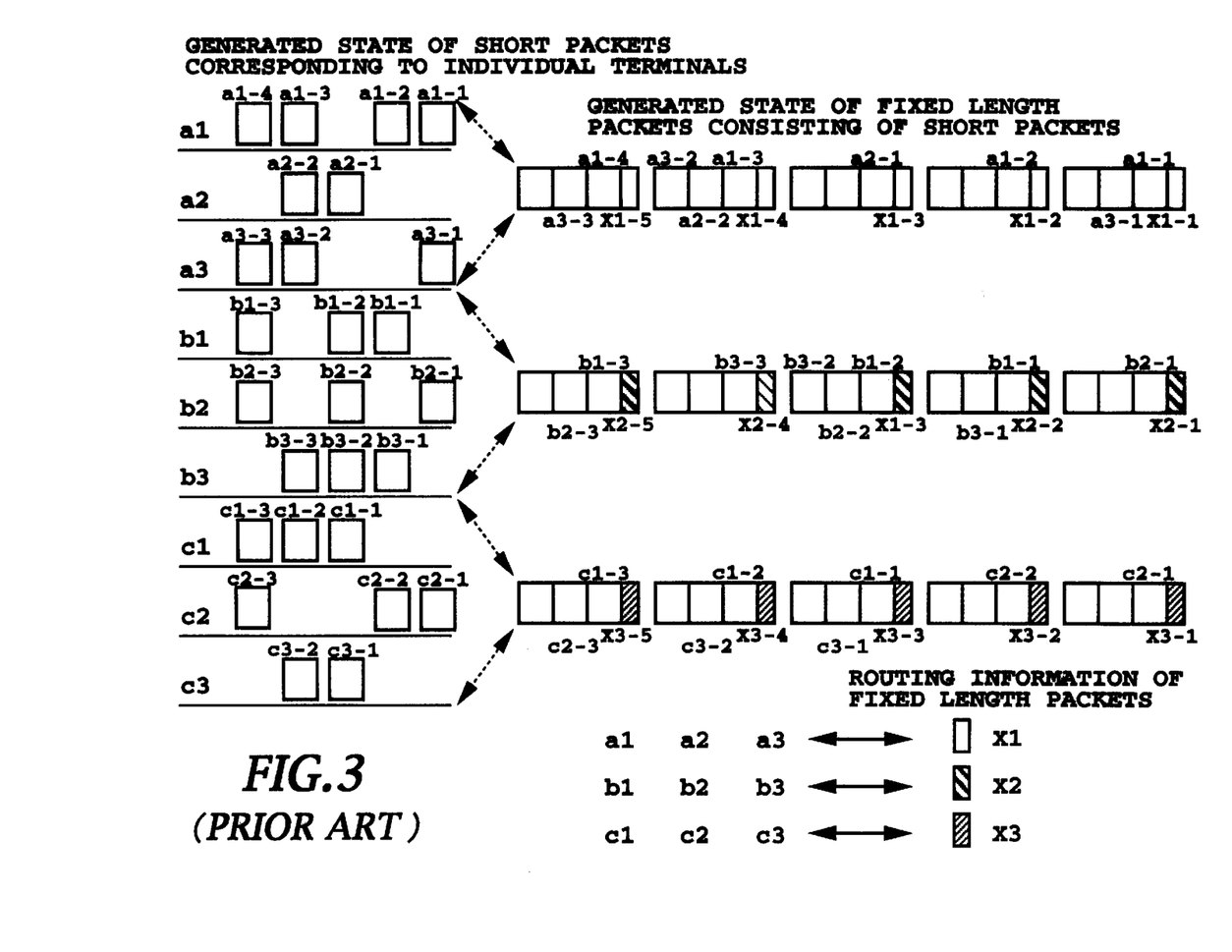
FIG. 3 is a schematic diagram illustrating a generating state of the fixed length packets by multiplexing the short packets in a conventional system.

FIG. 3 is a schematic diagram for illustrating a first method for assembling fixed length packets from short packets. In this figure, nine communication data assemblers/disassemblers a1–a3, b1–b3 and c1–c3 have one-to-one correspondence with respective terminals (fixed terminals or mobile terminals), and output short packet a1-1–a3-3, b1-1–b3-3 and c1-1–c3-3, respectively. These short packets are each fed to one of three fixed length packet assemblers/disassemblers (see, FIGS. 7A and 7B) which generate fixed length packets X1-1–X1-5, X2-1–X2-5 and X3-1–X3-5. More specifically, three communication data assemblers/disassemblers are assigned to a single fixed length packet assembler/disassembler so that each set of three short packets is multiplexed into one fixed length packet. In this case, since each fixed length packet can accommodate three short packets, they can be multiplexed into a fixed length packet without delay even if the packet occurrence is at its peak. In other words, FIG. 3 illustrates the generating method of the fixed length packets with reference to the peak value of the short packet occurrence.

Respective fixed length packets are provided with routing information X1, X2 and X3 indicating their destinations at the start of the communications. In the prior art system, however, the short packets are multiplexed into only preassigned fixed length packets. For example, as shown at the bottom of FIG. 3, the short packets generated by the communication data assemblers/disassemblers a1–a3 are multiplexed only to the fixed length packets X1-k, where k=1, 2, . . . This holds true for the short packets generated by the communication data assemblers/disassemblers b1–b3 and c1–c3, which can be multiplexed only to the fixed length packets X2-k and X3-k, respectively.

Blanks takes place in the fixed length packets other than the fixed length packets X1-4 and X2-3 in the example as shown in FIG. 3. That is, the short packets of the maximum possible number are not multiplexed in this example. This presents a problem in that dummy data must be filled in the blanks of the fixed length packets transmitted from the fixed length packet assemblers/disassemblers, thereby reducing the transmission efficiency.

Thus, the transmission efficiency is reduced in the method for multiplexing the short packets to the fixed length packets with reference to the peak value of the short packet occurrence, because the probability increases of the occurrence of the blanks in the fixed length packets.

Figure 4:
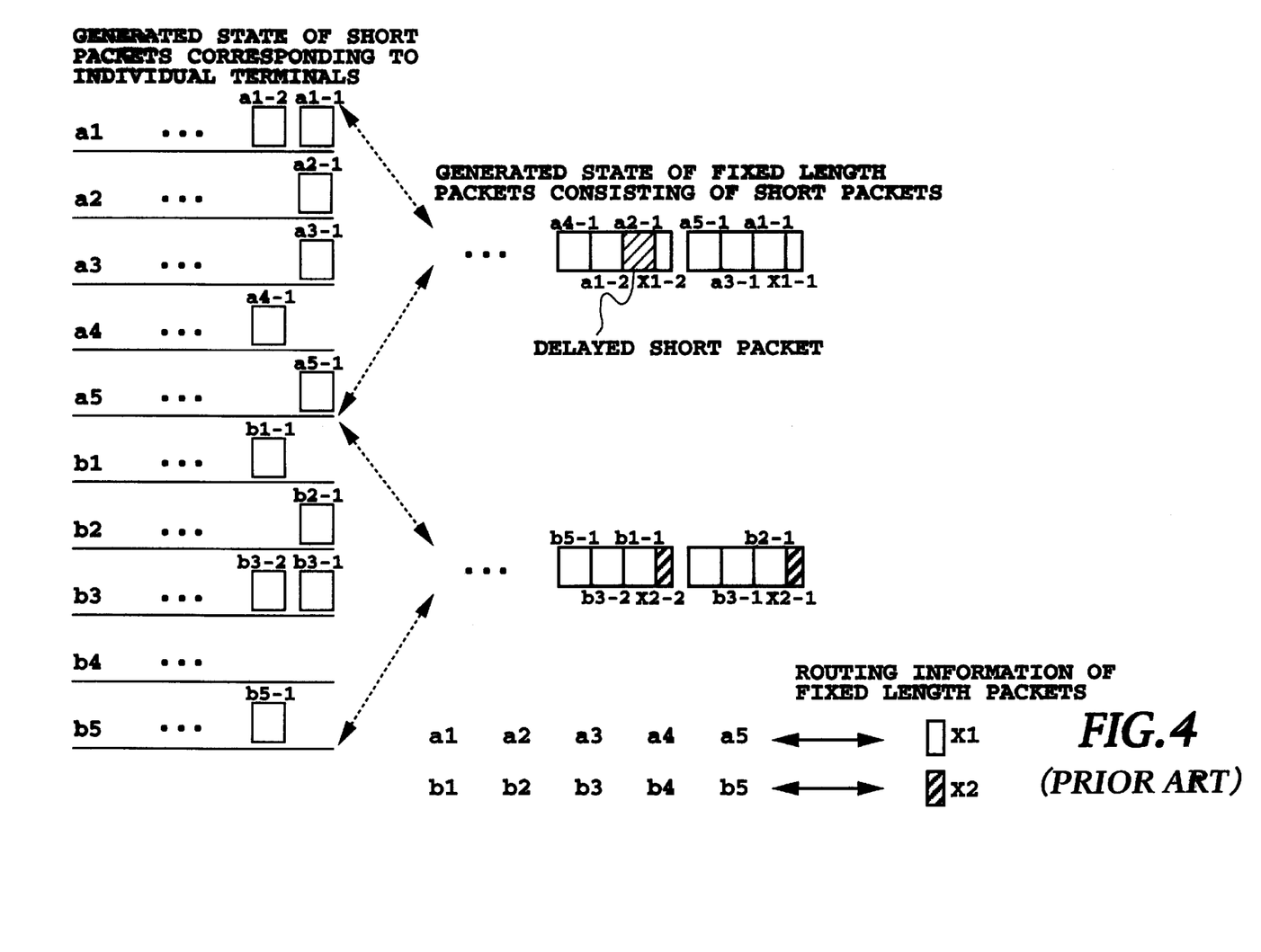
FIG. 4 is a schematic diagram illustrating another generating state of the fixed length packets by multiplexing the short packets in a conventional system.

FIG. 4 is a schematic diagram illustrating a second method for assembling the fixed length packets from the short packets, which is proposed to improved the above-mentioned problem. In this example, two fixed length packet assemblers/disassemblers are provided for ten communication data assemblers/disassemblers, so that the short packets a1-1 . . . , b1-1 . . . output from the communication data assemblers/disassemblers a1–a5, and b1–b5 are assembled to two fixed length packets X1-1, X1-2 . . . , and X2-1, X2-2 . . .

The second method differs from the first method in that the number of the communication data assemblers/disassemblers per one fixed length packet is increased from three to fine. This is based on the fact that the average value of the occurrence of the short packets from the five communication data assemblers/disassemblers a1–a5 is less than five. In other words, it is a multiplexing method with reference to the average value of the short packet occurrence.

In the second method, as in the first method, a fixed length packet to which the short packets are multiplexed is determined in advance as shown at the bottom of FIG. 4. For example, the short packets output from the communication data assemblers/disassemblers a1–a5, can be multiplexed only to fixed length packets X1-k, and the short packets output from the communication data assemblers/disassemblers b1–b5 can be multiplexed only to fixed length packets X2-k.

In the second method with reference to the average of the short packet occurrence, although the transmission efficiency will increase as compared with the first method with reference to the peak value of the short packet occurrence, a short packet exceeding the maximum possible multiplexing number is not multiplexed to the current fixed length packet to which the short packet should be multiplexed, but to the next fixed length packet. This presents a problem in that it causes a delay. For example, the short packet a2-1 in FIG. 4 is delayed because it is not multiplexed to the current fixed length packet X1-1, but to the next fixed length packet X1-2.

DISCLOSURE OF THE INVENTION

An object of the present invention is to provide a multicellular transmission method and apparatus that can prevent delay involved in assembling the short packets into the fixed length packets, and degradation of signals due to the delay.

Another object of the present invention is to provide a multicellular transmission method and apparatus that can make effective use of the transmission paths by preventing the transmission efficiency from being reduced in assembling the short packets into fixed length packets.

In a first aspect of the present invention, there is provided a multicellular transmission method which assembles signals sent from a plurality of source terminals into short packets at a first node in a network, multiplexes the short packets into fixed length packets, transfers the fixed length packets from the first node to a destination node in the network, and distributes, from the destination node to destination terminals, the signals sent from the source terminals, the first node comprising the steps of:
  identifying the destination node of the short packets from destination information of the short packets; and
  assembling the short packets into the fixed length packets which are to be sent to the destination node of the short packets.

Here, the one or more intermediate nodes between the first node and the destination node may transfer the fixed length packets to the destination node without changing the fixed length packets.

The first node may manage as a group the fixed length packets which are to be transferred to a same destination, and may comprise a step of assembling the short packets to any one of the fixed length packets of the same group.

The first node may comprise the steps of:
  monitoring a vacant state of the fixed length packets in the same group; and
  multiplexing the short packets into the fixed length packets with giving priority to one of the fixed length packets including a minimum blank.

The first node may comprise the steps of:
  measuring an occupied ratio of each of the fixed length packets by the short packets; and
  inhibiting the short packets from being multiplexed into the fixed length packets whose occupied ratio is higher than a predetermined threshold value.

The first node may be a mobile gateway switching center, and the destination node may be a radio base station.

The first node may be a radio base station and the destination node may be a mobile gateway switching center.

In a second aspect of the present invention, there is provided a multicellular transmission apparatus comprising:
  a plurality of communication data assemblers for assembling signals sent from source terminals into short packets;
  a plurality of fixed length packet assemblers for multiplexing the short packets into fixed length packets;
  means for identifying a destination node of the short packets in a network from destination information of the short packets;
  means for selecting, from the plurality of fixed length packet assemblers, fixed length packet assemblers for assembling the short packets into the fixed length packets which are to be sent to the destination node; and
  means for transferring the fixed length packets to the destination node in the network.

Here, the multicellular transmission apparatus may further comprise one or more intermediate nodes between the first node and the destination node, wherein the intermediate nodes transfer the fixed length packets to the destination node without changing the fixed length packets.

The multicellular transmission apparatus may further comprise means for managing as a group the fixed length packets which are to be transferred to a same destination, the means for selecting provides the short packets to any one of the fixed length packet assemblers for generating the fixed length packets of the same group.

The multicellular transmission apparatus may further comprise means for monitoring a vacant state of the fixed length packets in the same group, wherein the means for selecting supplies the fixed length packet assemblers with the short packets with giving priority to the fixed length packet assemblers corresponding to fixed length packets including a minimum blank.

The multicellular may further comprise:
  means for measuring an occupied ratio of each of the fixed length packets by the short packets; and
  means for inhibiting the short packets from being multiplexed into the fixed length packets whose occupied ratio is higher than a predetermined threshold value.

The multicellular transmission apparatus may be installed in a mobile gateway switching center, and the destination node may be a radio base station.

The multicellular transmission apparatus may be installed in a radio base station, and the destination node may be a mobile gateway switching center.

According to the present invention, low speed signals sent from the communication terminals are converted into short packets which are to be multiplexed to fixed length packets. In this case, one or more fixed length packets bound for the same intra-network node (destination) are managed as a group, so that the short packets are multiplexed to one of the fixed length packet in the same group. This can obviate the assembling and disassembling of the short packets into the fixed length packets in the intermediate switching centers, and hence can reduce the transfer delay by that amount.

In addition, since the correspondence between the short packets and fixed length packets is changed from many:one to many:many, the degree of freedom is increased for selecting the fixed length packet to which the short packets are multiplexed. As a result, the delay due to conversion from the short packets to the fixed length packets can be reduced. In addition, since the short packets can be effectively incorporated into any fixed length packets including a blank, the channel efficiency can be improved.

BEST MODE FOR CARRYING OUT THE INVENTION

An embodiment of a multicellular transmission method and apparatus in accordance with the present invention will now be described. Before that, however, the principle of the present invention will be described with reference to FIGS. 5 and 6.

Figure 5:
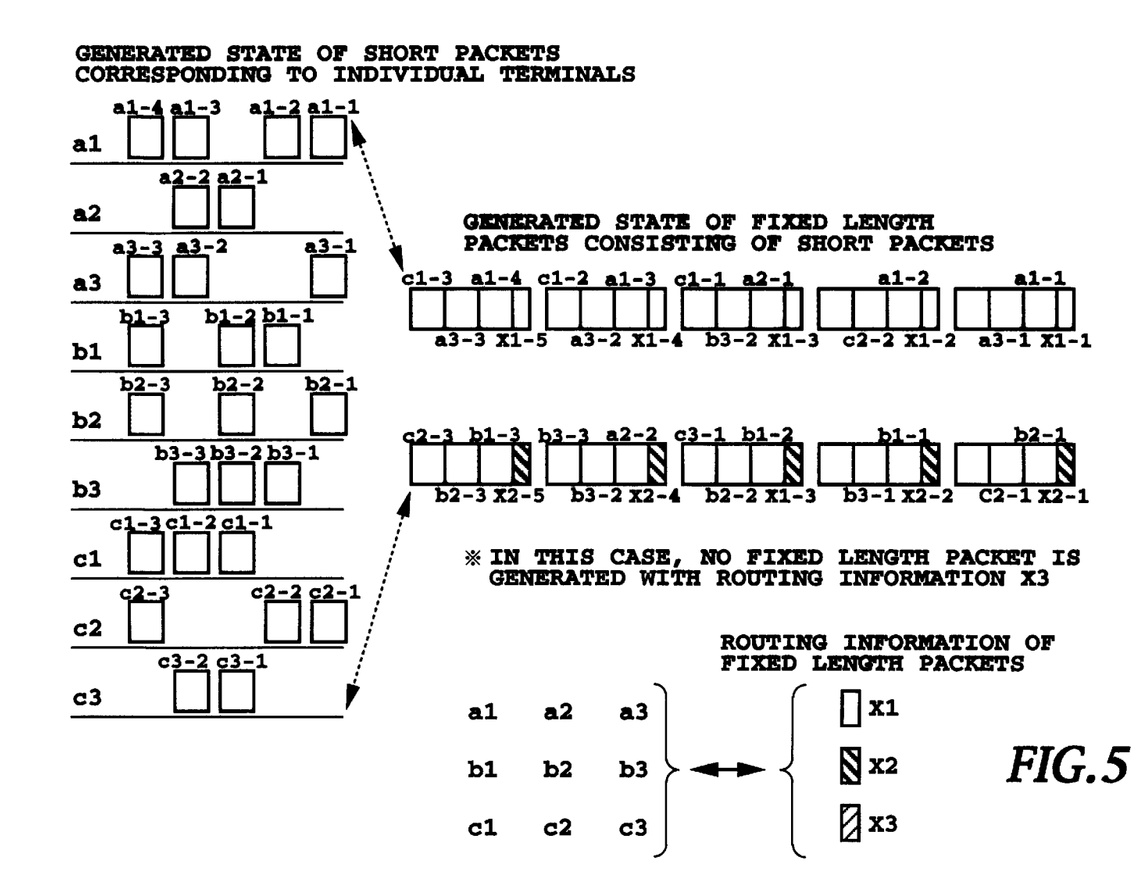
FIG. 5 is a schematic diagram illustrating a generating state of the fixed length packets by multiplexing the short packets in an apparatus in accordance with the present invention.

FIG. 5 shows a case in which the short packets are multiplexed into the fixed length packets with reference to the peak value of the short packet occurrence. In FIG. 5, it is assumed that all the nine communication data assemblers/disassemblers a1–a3, b1–b3 and c1–c3, which are connected to respective communication terminals (mobile terminals 10 or fixed terminals 610), output short packets bound for the same intra-network node (for example, a particular radio base station 100). Three fixed length packets bound for the same radio base station 100 is prepared for the nine short packets as fixed length packets belonging to the same group so that the nine short packets can be multiplexed to any one of these fixed length packets. In other words, a short packet output from one of the communication data assemblers/disassemblers can be incorporated into any one of the three fixed length packets of the same group, including a vacant area. For example, the short packet output from the communication data assembler/disassembler a1 can be multiplexed into any one of the three fixed length packets with routing information X1, X2 and X3.

Thus, the present invention has two features.

(1) The fixed length packets bound for the same intra-network node is gathered into one group, and a short packet bound for that intra-network node is multiplexed to any one of the fixed length packets in the group from the beginning. This obviates the assembling/disassembling of the fixed length packet at the intermediate switching centers, thereby reducing the transfer delay involved in the assembling/disassembling of the fixed length packet.

(2) Since the short packets output from the communication data assembler/disassembler can be incorporated into any one of the fixed length packets in the same group, the availability of the fixed length packets can be improved.

In the conventional method as shown in FIGS. 3 and 4, a single fixed length packet is assigned to three communication data assemblers/disassemblers. In contrast, in the present invention, three fixed length packets are assigned to nine communication data assemblers/disassemblers. Accordingly, although the present invention has the same ratio between the communication data assemblers/disassemblers and the fixed length packet as the conventional method, it can more freely select a vacant fixed length packet. This makes it possible to increase the degree of freedom of selecting the fixed length packet, thereby reducing the delay and improving the channel availability.

Let us explain this by comparing the method in accordance with the present invention as shown in FIG. 5 with the conventional method as shown in FIG. 3. For example, to the fixed length packets with the routing information X1, can be multiplexed not only the short packets from the communication data assemblers/disassemblers of the a-group, but also those from the communication data assemblers/disassemblers of the b- and c-groups. Accordingly, the occupied ratio of the fixed length packet by the short packets increases, thereby augmenting the availability of the fixed length packet. The example of FIG. 5 does not generate the fixed length packet whose header is the routing information X3, because it is unnecessary to send it, thus increasing the transmission efficiency.

Figure 6:
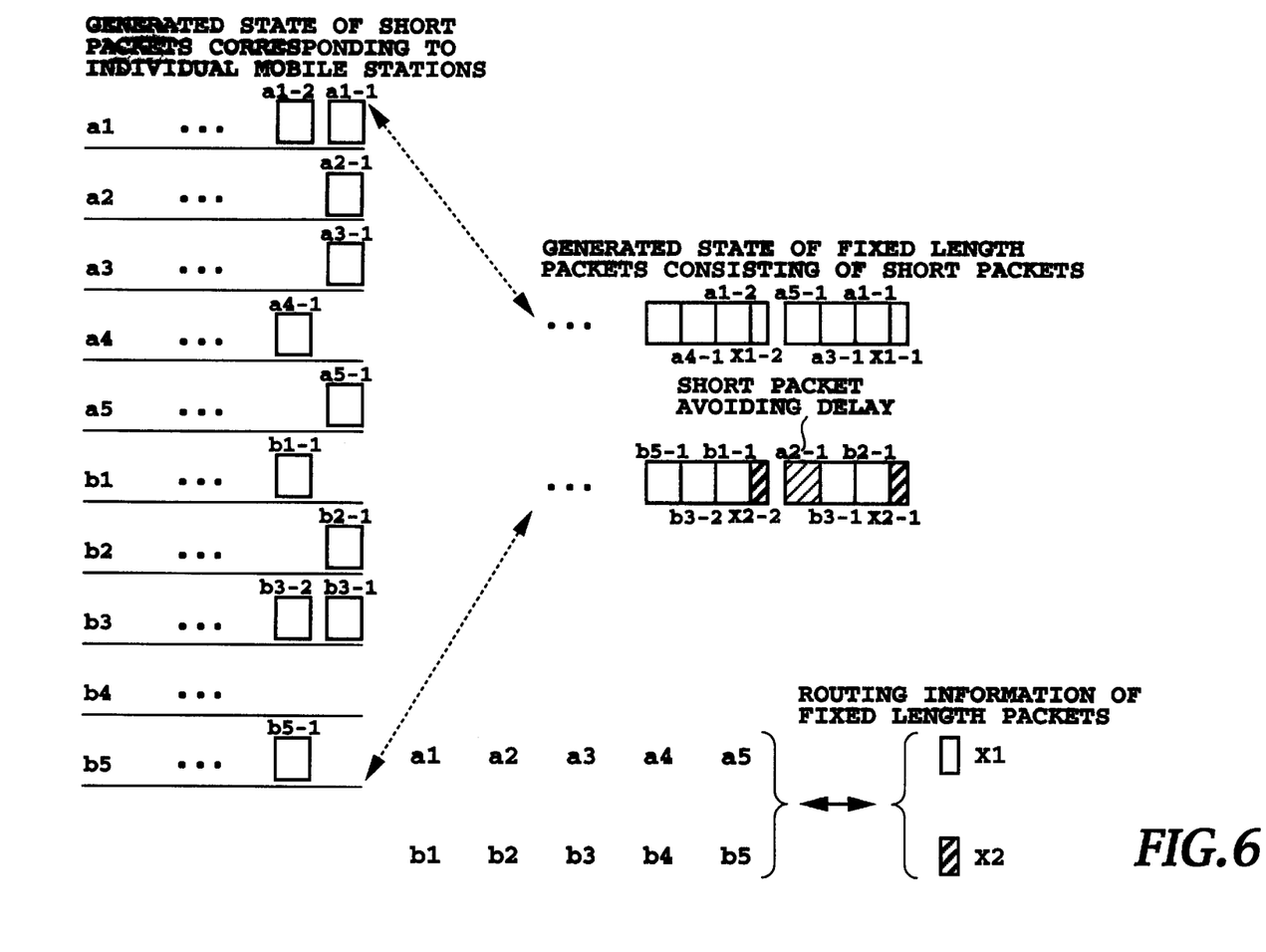
FIG. 6 is a schematic diagram illustrating another generating state of the fixed length packets by multiplexing the short packets in the apparatus in accordance with the present invention.

FIG. 6 shows a case when the multiplexing of the short packets to the fixed length packets is carried out with reference to the average value of the short packet occurrence. Ten communication data assemblers/disassemblers a1–a5 and b1–b5, each associated with each one of the communication terminals, correspond to two fixed length packets whose headers are routing information X1 and X2, respectively. The short packets output from the communication data assembler/disassembler a1, for example, can be multiplexed to either of the two fixed length packets. The example of FIG. 6 multiplexes the short packet a2-1 into the fixed length packet X2-1. This makes it possible to avoid the delay of the short packet a2-1, which occurred in the conventional method as shown in FIG. 4.

Next, an embodiment of the present invention will be described with reference to the drawings. In the following description, it is assumed that a reference numeral whose suffixes are omitted designates any one or more of a plurality of blocks designated by the reference numeral. For example, the radio base station(s) 100 refers to any one or more radio base stations of the k radio base stations $100_1$–$100_k$.

Figures 7, 7A:
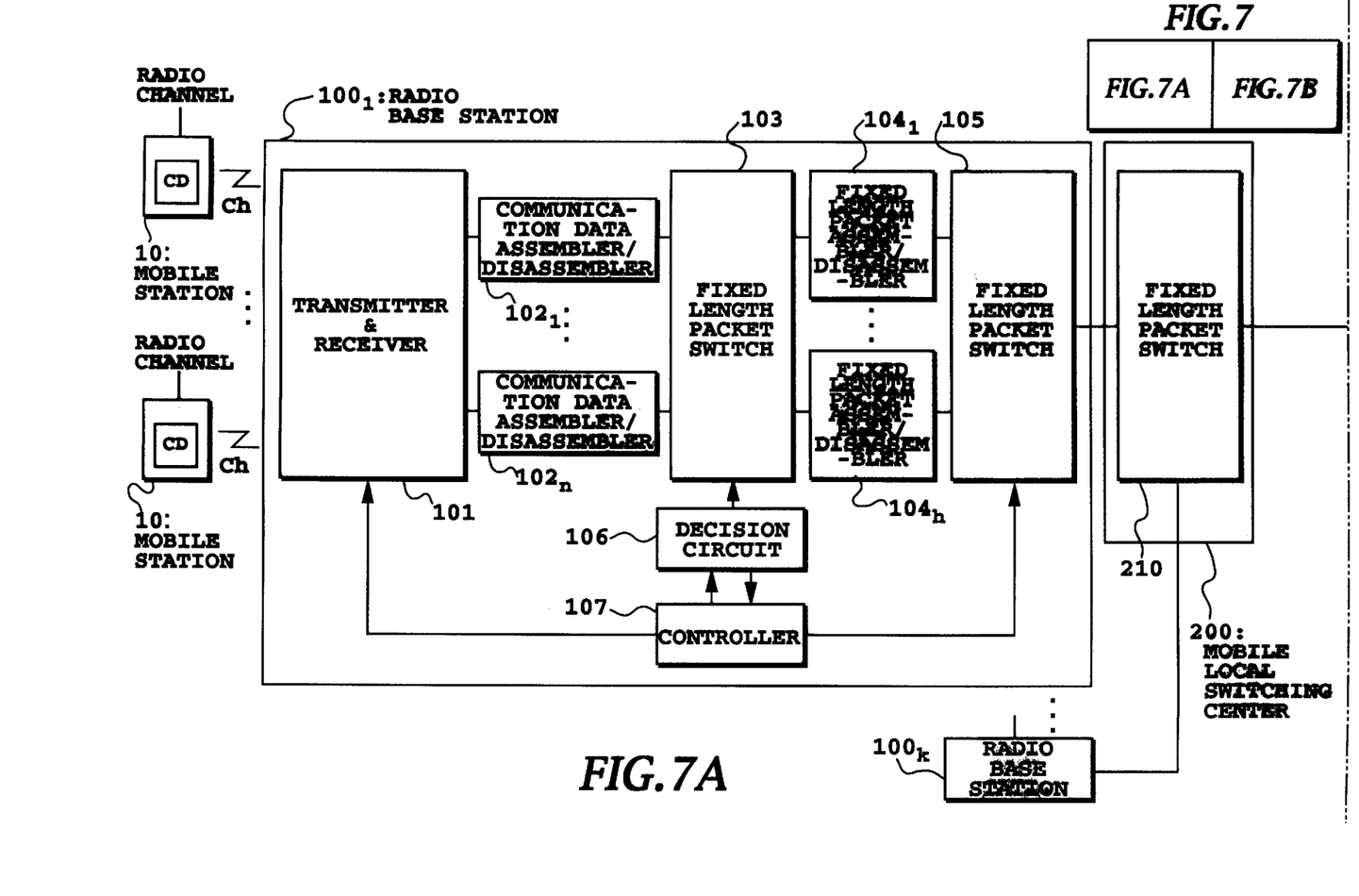
FIGS. 7A and 7B are block diagrams showing an embodiment of a multicellular transmission apparatus in accordance with the present invention.
Figure 7B:
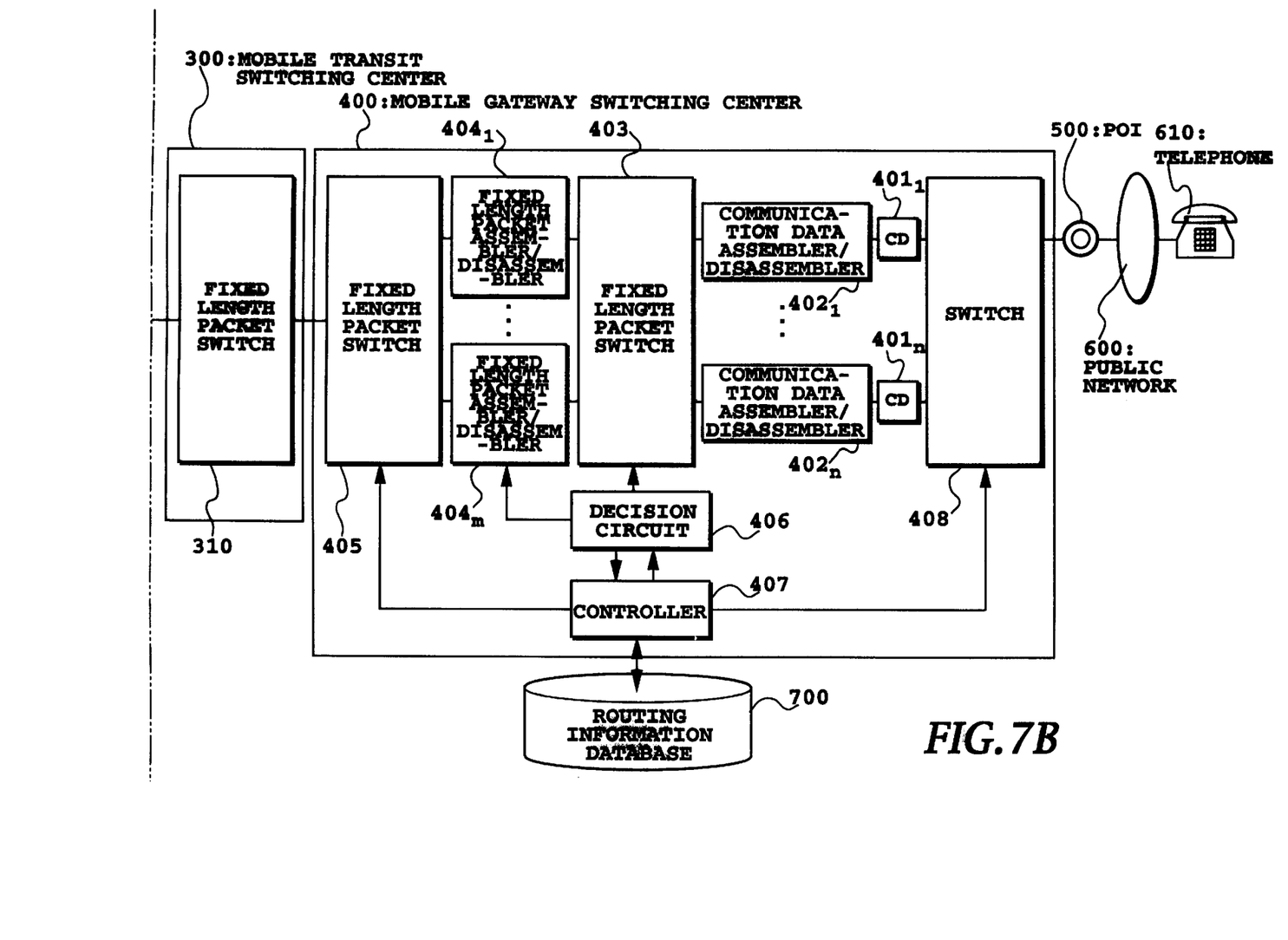

FIGS. 7A and 7B are block diagrams showing an embodiment of a multicellular transmission apparatus in accordance with the present invention. In these figures, the radio base stations 100 are connected to the mobile gateway switching center 400 via the mobile local switching center 200 and mobile transit switching center 300. These centers together with the radio base stations are called an intra-network node in this specification. The mobile stations 10 are connected to the base stations 100 through the radio channels ch. On the other hand, the telephone set 610 is connected to the mobile gateway switching center 400 via the point of interface 500 and public network 600.

The embodiment will now be described in more detail by way of an example in which the telephone set 610 communicates with the mobile station 10 through the mobile gateway switching center 400.

(1) Arrangement and operation associated with channel setting.

A call from the fixed terminal 610 to the mobile station 10 is detected by a controller 407 of the mobile gateway switching center 400. More specifically, the signal from fixed terminal 610 is transmitted to the mobile gateway switching center 400 via the public network 600 and the point of interface 500. In the mobile gateway switching center 400, the received signal is supplied to a communication data assembler/disassembler 402 via a switch 408 and a code converter 401. The code converter 401 carries out bidirectional conversion between the communication signals used in the mobile network and the public network.

The communication data assembler/disassembler 402 assembles low speed information output from the code converter 401 into short packets, adds sequence numbers to the received information, and relocates the received information in accordance with the order of sequence numbers. This is because when the short packets output from the communication data assembler/disassembler are multiplexed into a plurality of fixed length packets to be transmitted, their arriving order at the receiving side can differ from their transmitted order. In other words, the sequence of the short packets may be disturbed owing to the generating states of the fixed length packets, or to the courses of the fixed length packets through the switching centers in the mobile communication network.

Each short packet output from the communication data assembler/disassembler 402 holds the number of the destination mobile station as call identifying information. The controller 407 of the mobile gateway switching center 400 decides the destination radio base station 100 using the call identifying information, and sets routing information to be held in the header of the fixed length packet, thereby performing a channel setting.

Specifically, the controller 407 carries out a paging for the mobile station 10 through the plurality of radio base station 100 in the area at which the location registration of the mobile station 10 is kept. When the paged mobile station 10 responds, the radio base station which receives the response becomes a visitor base station, and the controller 407 is notified of the number of the radio base station. In this case, let us supposed that the visitor base station is the radio base station $100_1$.

Next, a channel is set between the mobile gateway switching center 400 and the visitor base station $100_1$.

First, the controller 407 accesses a database 700 to acquire routing information for the radio base station $100_1$, the destination in the network. The acquired routing information is written to the header of a fixed length packet to generate the fixed length packet as shown in FIGS. 5 and 6.

The generation of the fixed length packets is carried out by a fixed length packet assembler/disassembler 404. First, the controller 407 selects a vacant fixed length packet assembler/disassembler 404 through a decision circuit 406, and provides it with the routing information. The selected fixed length packet assembler/disassembler 404 forms a fixed length packet with its header consisting of the routing information and its data part consisting of the short packet from the communication data assembler/disassembler 402, and supplies the fixed length packet to a fixed length packet switch 405. Although the fixed length packet and the fixed length packet assembler/disassembler 404 have one-to-one correspondence with the routing information, the correspondence is not fixed. This has already been described with reference to FIGS. 5 and 6.

When there are a plurality of fixed length packets bound for the same destination in the network, the routing information of these fixed length packets are managed as one group. In other words, the routing information is grouped for each destination, and is stored in the database as group information to be managed.

Figure 8:
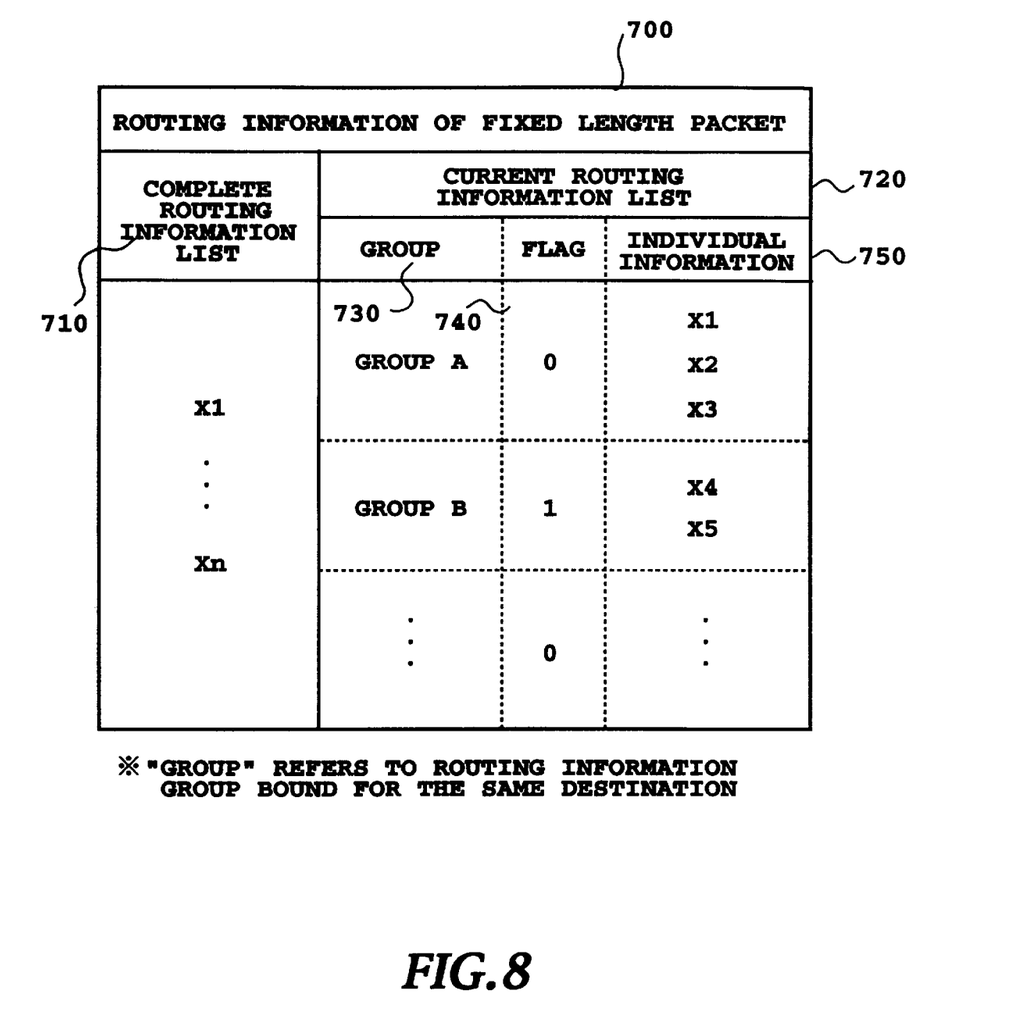
FIG. 8 is a schematic diagram illustrating routing information of a fixed length packet stored in a database of the embodiment.

FIG. 8 is a schematic diagram showing the structure of the routing information stored in the database 700. The routing information consists of a complete routing information list 710 for storing the entire routing information, and a current routing information list 720 for storing the routing information which is now in use.

The current routing information list 720 stores various routing information designating the same destinations in the network as group information 730. Thus, individual routing information 750 now in use is stored as group information 730. For example, individual routing information X1, X2 and X3 in FIG. 5 is not only registered as individual information 750, but also as the group information 730. This is because the routing information X1, X2 and X3 of the three fixed length packets is bound for the same intra-network node. Flags 740 are provided for indicating that the fixed length packet group corresponding to the group information 730 does not satisfy predetermined communication quality. Such a situation may occur if multiplexing is tried of a new call into the current fixed length packet group.

Figure 9:
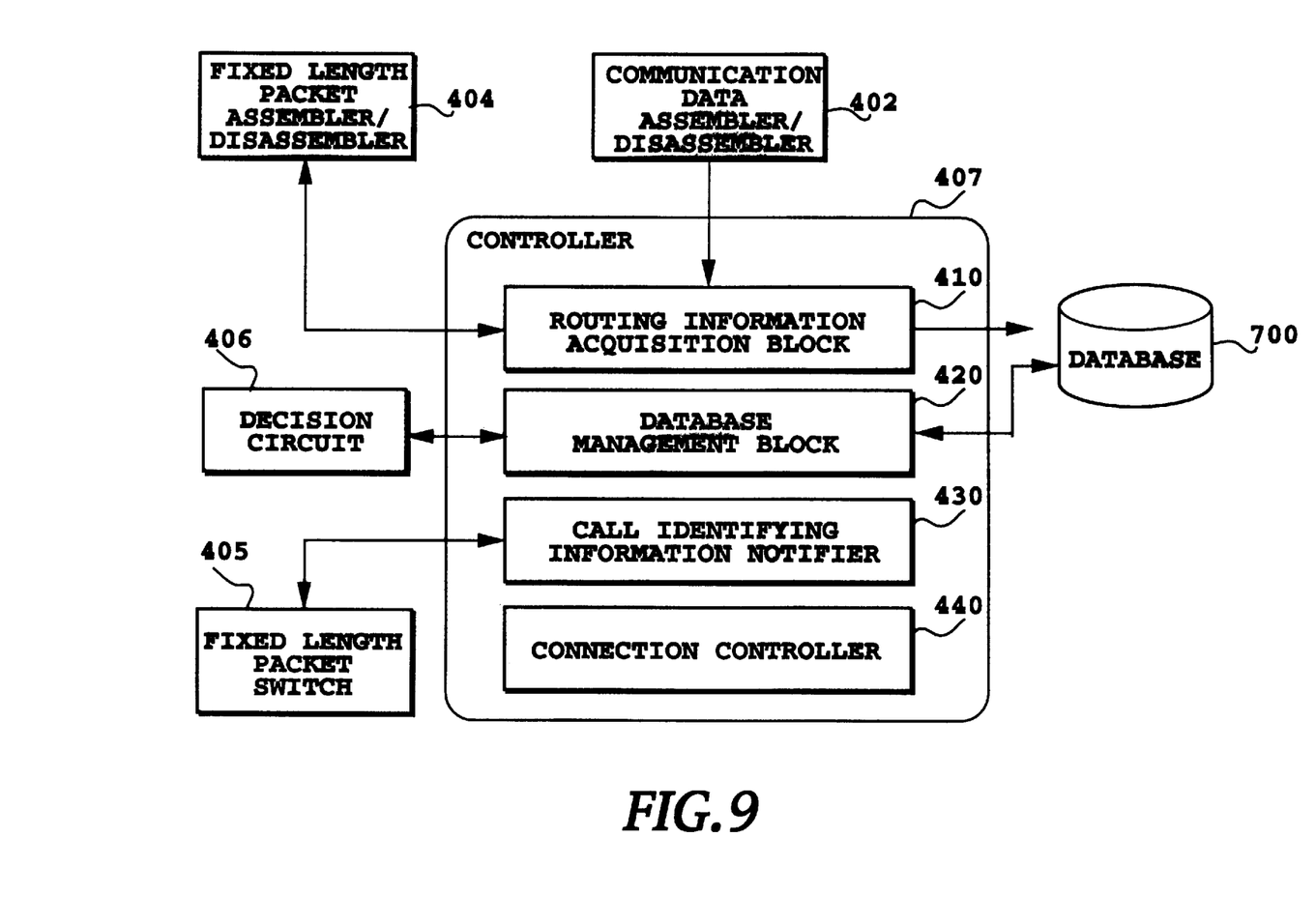
FIG. 9 is a block diagram showing a configuration of a controller of a gateway switching center in accordance with the present invention.

FIG. 9 is a block diagram showing the configuration of the controller 407 in the mobile gateway switching center 400. The controller 407 manages the routing information and database 700. It comprises a routing information acquisition block 410, a database management block 420, a call identifying information notifier 430, and a connection controller 440 which controls fixed length packet switches 403 and 405.

Figure 10:
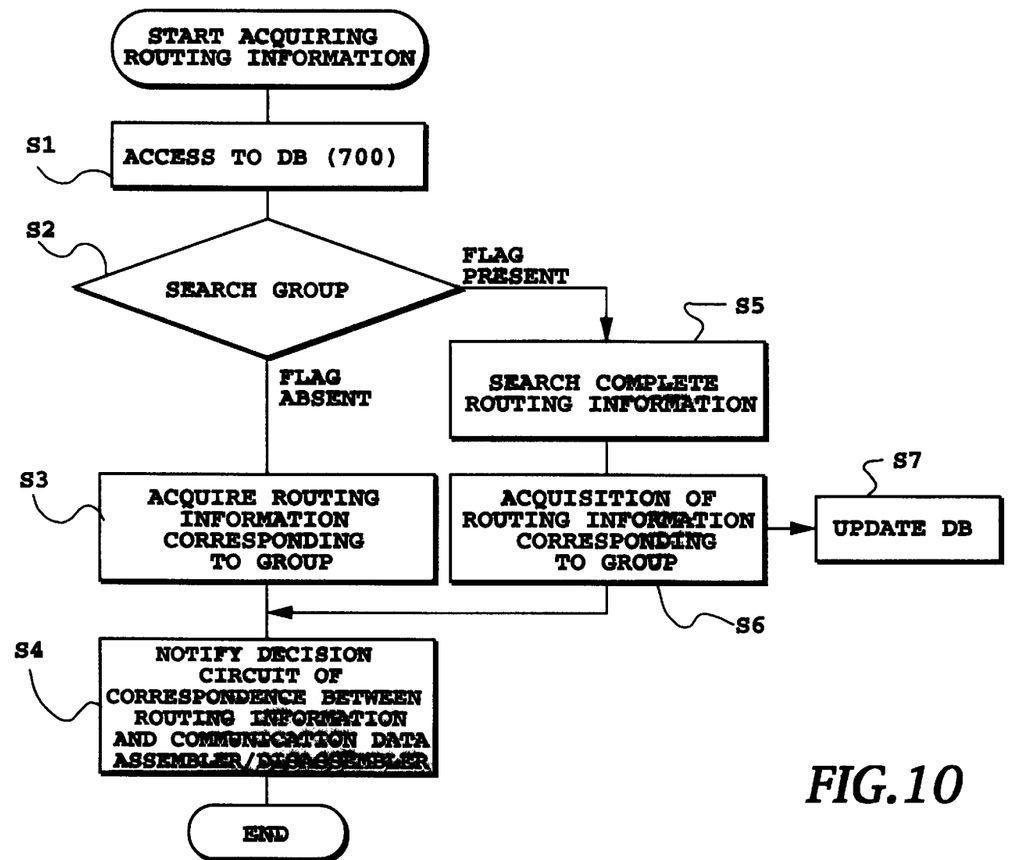
FIG. 10 is a flowchart showing the operation of a routing information acquisition block of the controller of the gateway switching center as shown in FIG. 9.

As shown in the flowchart of FIG. 10, after the intra-network destination (in this case, the radio base station $100_1$) of the call from the fixed terminal 610 has been decided, the routing information acquisition block 410 accesses the database 700 (step S1) to search for the group information 730 bound for the destination node (step S2). If no flag is affixed to the searched group information, that is, if at least one of the fixed length packets now in use is available, the routing information corresponding to the group number is acquired (step S3). Subsequently, the routing information acquisition block 410 notifies the decision block 406 of the relationship between the acquired routing information and the communication data assembler/disassembler 402 for handling the call (step S4). In this case, the routing information in the database 700 is not rewritten. The reason for this is that the routing information is unchanged because the short packet is sent using the fixed length packet now in use.

In contrast, if the flag is affixed to the group information bound for the destination, the fixed length packets associated with the routing information of the group are occupied and unavailable. Thus, the routing information acquisition block 410 searches the complete routing information list 710 (step S5), and acquires the routing information which is not in use and corresponds to this group (step S6). Then, the routing information acquisition block 410 notifies the decision circuit 406 of the relationship between the obtained routing information and the communication data assembler/disassembler. In this case, the routing information acquisition block 410 updates the current routing information in the database (step S7). Specifically, if the destination group has already been set, it adds the acquired routing information as the individual information 750 of that group. On the other hand, if the destination group has not yet been set, that is, if the acquired routing information is the first fixed length packet bound for the decided destination, the routing information is registered not only as the individual information 750, but also as the group information 730. When acquiring the new routing information, the routing information acquisition block 410 notifies the decision circuit 406 of the fact that the group information in use is updated.

Figure 11:
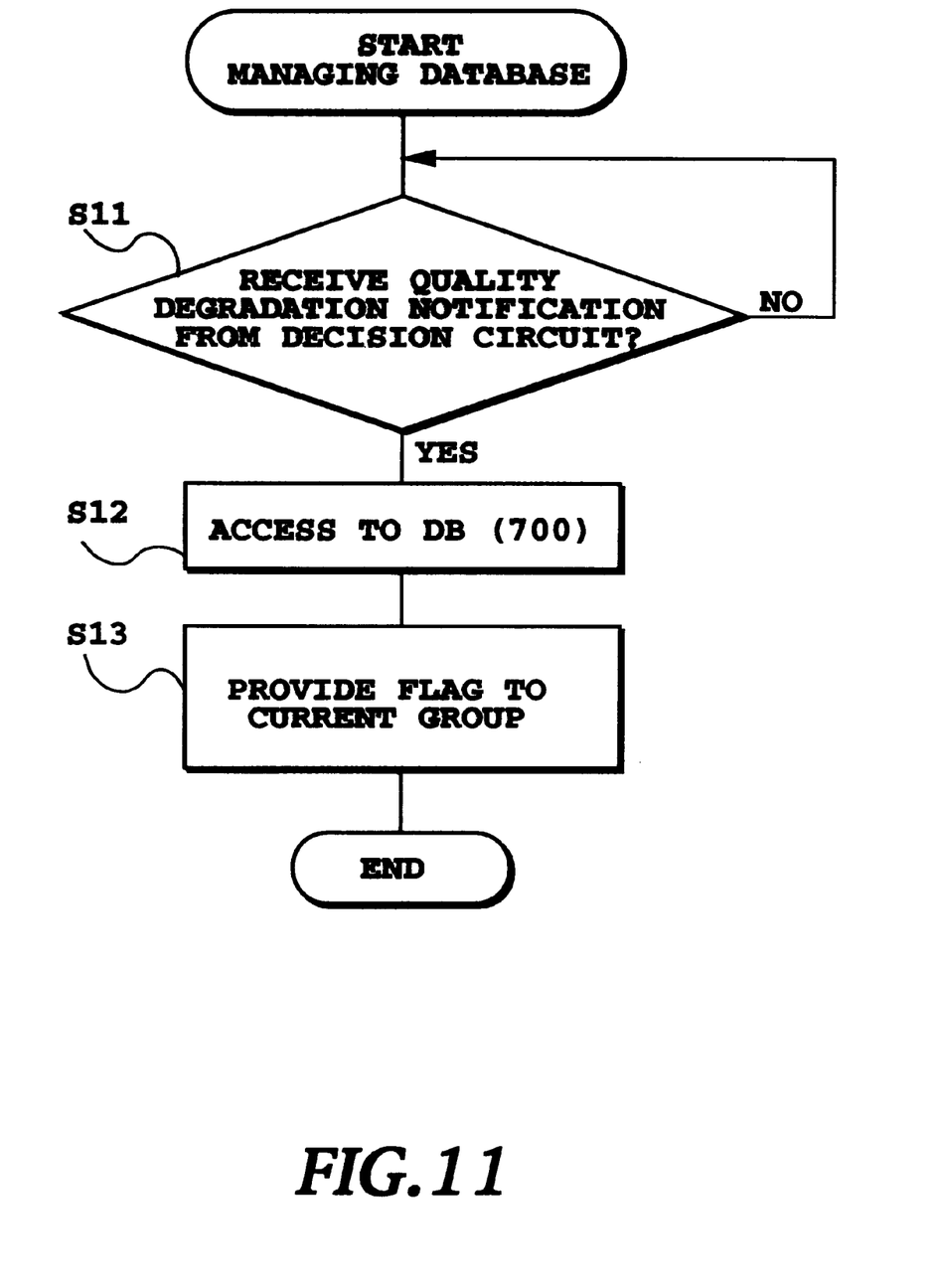
FIG. 11 is a flowchart illustrating the operation of a database management block of the controller of the gateway switching center as shown in FIG. 9.

The database management block 420 carries out the processing as illustrated in the flowchart of FIG. 11. More specifically, when the database management block 420 receives from the decision circuit 406 the notification that the fixed length packets in use no longer satisfy the predetermined communication quality if a new call is to be multiplexed (step S11), it accesses the routing information of fixed length packets 700 (step S12), and raises the flag 740 of the group information 730 now in use (step S13). The flag 740 indicates that new routing information not in use should be selected from the complete routing information list 710 for calls occurring henceforth.

The call identifying information notifier 430 notifies a controller 107 in the destination radio base station 100₁ about the group information and the call identification information. Specifically, the call identifying information notifier 430, after having acquired the routing information bound for the destination radio base station 100₁, notifies the controller 107 in the destination radio base station 100₁ of the group information and the call identifying information through the mobile transit switching center 300 and the mobile local switching center 200.

The controller 107 of the radio base station 100₁, receiving the notification, selects fixed length packet assemblers/disassemblers 104 corresponding to the group information, and controls a fixed length packet switch 105 such that the transferred fixed length packets are distributed to the selected fixed length packet assemblers/disassemblers 104. The controller 107 notifies the decision circuit 106 of the call identifying information. Thus, the decision circuit 106 controls the fixed length packet switch 103 such that the short packets output from the fixed length packet assemblers/disassemblers 104 are distributed to the communication data assemblers/disassemblers 102 corresponding to the call identifying information. The short packets distributed to the communication data assemblers/disassemblers 102 are disassembled into low speed information, which are in turn transmitted to the mobile stations 10 connected to the communication data assemblers/disassemblers 102 through a transmitter & receiver 101.

Thus, the call identifying information notifier 430 notifies the radio base station 100₁ of the new call identifying information and the group information. In this case, vacant routing information is selected between the mobile transit switching center 300 and the mobile local switching center 200, and the mobile local switching center 200 and the radio base station 100₁. The selected routing information is set in the header of the fixed length packet at each nodes, and notified to the radio base station 100₁.

Thus, the channel is set, thereby enabling the exchange of the information.

(2) Arrangement and operation associated with communications after the channel setting.

Upon starting the communications between the fixed terminal 610 and the mobile station 10, the decision circuit 406 of the mobile gateway switching center 400 monitors the stored state of the data part of each fixed length packet. In accordance with the monitored results, the decision circuit 406 controls the fixed length packet switch 403 such that the short packets output from the communication data assemblers/disassemblers 402 are assigned to one of the fixed length packet assemblers/disassemblers corresponding to the routing information in the group information. This control corresponds to the foregoing description in connection with FIGS. 5 and 6. The assignment is carried such that the generated fixed length packet is filled rather than that the short packets are distributed evenly to the plurality of the fixed length packet assemblers/disassemblers. In other words, the fixed length packet with the data part of less space is given higher priority in the selection, thereby increasing the availability of the fixed length packet.

The decision circuit 406 decides whether the predetermined communication quality can be satisfied or not in multiplexing the plurality of short packets into the fixed length packet. In other words, it decides whether or not the multiplexing of the short packets, which are output from the communication data assemblers/disassemblers, into the fixed length packet of the group satisfies a delay standard involved in packeting. This decision is made on the basis of the input state of the short packets to one or more fixed length packet assemblers/disassemblers corresponding to the group information now in use. If the delay standard involved in packeting is satisfied, the decision circuit 406 does not take any particular steps. In contrast, if it is not satisfied, the decision circuit 406 notifies the controller 407 of that fact.

As the delay standard involved in pocketing, is used the occupied ratio of the fixed length packet formed by multiplexing the short packets. This is because the occupied ratio has a high correlation with the delay. Specifically, as the occupied ratio increases, the possibility increases that the maximum possible number of short packets to be multiplexed arrives at the fixed length packet assemblers/disassemblers. A short packet exceeding the maximum possible number to be multiplexed cannot be multiplexed to the fixed length packet into which it should be multiplexed, thereby causing a delay. The decision circuit 406 regularly monitors the occupied ratio, which is calculated for each group bound for the same destination.

Thus, the fixed length packet transmitted from the mobile gateway switching center 400 passes through the mobile transit switching center 300 and the mobile local switching center 200 in response to the routing information included in the header. In the course of this, the routing information is selected in accordance with its destination at the beginning of the communication. Accordingly, all the short packets multiplexed into the fixed length packet are transferred to the destination radio base station $100_1$. Thus, it is not necessary for the mobile transit switching center 300 and mobile local switching center 200, through which the fixed length packets pass, to have assembling/disassembling function of the fixed length packets because the fixed length packets are transferred in accordance with the routing information contained in the header thereof.

Although the foregoing description explains the call connection from the fixed terminal 610 in the fixed network to the mobile station 10, a call in the opposite direction from the mobile station 10 can be handled in a similar manner, because the channel setting procedure after the response of the mobile station to the paging of the radio base stations is similar to that described above, and hence the routing information indicative of the destination can be acquired to achieve communications by using a means and procedure similar to those of the foregoing embodiment. In this case, the controller 107 of the radio base stations 100 is provided with a database to manage the routing information from the radio base stations 100 to the mobile gateway switching center 400. Besides, the decision circuit 106 operates in a manner similar to the decision circuit 406.

Although this embodiment is explained in the case where the destination is the radio base station, other nodes can be adopted to achieve similar effect with a similar arrangement as long as the nodes is provided with the fixed length packet assembling/disassembling function. In addition, although the embodiment explains the information transfer from a higher order node (switching center) to a lower order node (radio base station), the reverse information transfer from the lower to higher order node can be implemented in a similar manner.

What is claimed is:

1. A multicellular transmission method comprising the steps of:
    assembling signals sent from a plurality of source terminals into short packets bound for a same destination node at a first node in a network;
    assembling said short packets into a fixed length packet which is to be sent to a destination node of said short packets;
    identifying said destination node of said short packets from destination information of said short packets;
    transferring said fixed length packet from said first node to said destination node; and
    distributing, from said destination node to at least one destination terminal, the signals sent from said source terminals.

2. The multicellular transmission method of claim 1, wherein at least one intermediate node between said first node and said destination node transfers said fixed length packet to said destination node without changing said fixed length packet.

3. The multicellular transmission method of claim 1, wherein said first node is a mobile gateway switching center, and said destination node is a radio base station.

4. The multicellular transmission method of claim 1, wherein said first node is a radio base station and said destination node is a mobile gateway switching center.

5. A multicellular transmission apparatus comprising:
    a plurality of communication data assemblers for assembling signals sent from source terminals into short packets bound for a same destination node;
    a plurality of fixed length packet assemblers for multiplexing said short packets into fixed length packets;
    an identifier, said identifier identifying the destination node of said short packets from destination information of said short packets;
    a selector, said selector selecting at least one fixed length packet assembler for assembling said short packets into said fixed length packets which are to be sent to said destination node; and
    a transmitter, said transmitter transferring said fixed length packets to said destination node.

6. The multicellular transmission apparatus of claim 5, further comprising at least one intermediate node between said first node and said destination node, wherein said intermediate node transfers said fixed length packets to said destination node without changing said fixed length packets.

7. The multicellular transmission apparatus of claim 6, further comprising a data manager, said data manager managing as a group said fixed length packets which are to be transferred to a same destination, and said selector providing said short packets to at least one of said fixed length packet assemblers for generating said fixed length packets of the same group.

8. The multicellular transmission apparatus of claim 7, further comprising a monitoring device, said monitoring device monitoring a vacant state of said fixed length packets in said same group, wherein said selector supplying said fixed length packet assemblers with said short packets, giving priority to said fixed length packet assemblers corresponding to fixed length packets including a minimum blank.

9. The multicellular transmission apparatus of claim 8, further comprising:
    a measuring device, said measuring device measuring an occupied ratio of each of said fixed length packets by said short packets; and
    an inhibitor, said inhibitor inhibiting said short packets from being multiplexed into said fixed length packets whose occupied ratio is higher than a predetermined threshold value.

10. The multicellular transmission apparatus of claim 5, wherein said multicellular transmission apparatus is installed in a mobile gateway switching center, and said destination node is a radio base station.

11. The multicellular transmission apparatus of claim 5, wherein said multicellular transmission apparatus is installed in a radio base station, and said destination node is a mobile gateway switching center.

12. A multicellular transmission method comprising the steps of:
    assembling signals sent from a plurality of source terminals into short packets bound for a same destination node at a first node in a network;
    assembling said short packets into fixed length packets which are to be sent to a destination node of said short packets;
    identifying said destination node of said short packets from destination information of said short packets;

transferring said fixed length packets from said first node to said destination node in the network; and distributing, from said destination node to at least one destination terminal, the signals sent from said source terminals.

13. The multicellular transmission method of claim 12, wherein said first node manages as a same group said fixed length packets which are to be transferred to a same destination, and further comprising the step of assembling each of said short packets into one of said fixed length packets of the same group.

14. The multicellular transmission method of claim further comprising the steps of:

monitoring a vacant state of said fixed length packets in said same group; and assembling said short packets into said fixed length packets, giving priority to at least one of said fixed length packets including a minimum blank.

15. The multicellular transmission method of claim 14, further comprising the steps of:

measuring an occupied ratio of each of said fixed length packets by said short packets; and inhibiting said short packets from being assembled into said fixed length packets whose occupied ratio is higher than a predetermined threshold value.

16. A multicellular transmission method comprising the steps of:

assembling signals sent from a plurality of source terminals into short packets bound for a same destination node at a first node in a network;

assembling the short packets into fixed length packets each of which are to be sent to the destination node of the short packets;

for each destination node to which the fixed length packets are transferred, managing the corresponding fixed length packets as a group;

assembling each of the short packets into one of the fixed length packets of the group corresponding to the destination node of the short packet;

identifying the destination node of each short packet from destination information of the short packet;

transferring the fixed length packets from the first node to the destination node in the network;

distributing, from the destination node to at least one destination terminal, the signals sent from the source terminals.

17. A multicellular transmission apparatus comprising:

a plurality of communication data assemblers coupled to a plurality of fixed length packet assemblers, the communication data assemblers assembling signals received from source terminals into short packets bound for a same destination node and transmitting the short packets to the fixed length packet assemblers;

a destination node identifier coupled to the communication data assembler, the destination node identifier identifying a destination node of each short packet from short packet destination information;

a selector coupled to the destination node identifier and the plurality of fixed length packet assemblers, for each short packet, the selector determining the fixed length packet assembler to be used to assemble the short packet into the fixed length packet corresponding to the destination node based on the short packet destination information; and a transmitter coupled to the plurality of fixed length packet assemblers, the transmitter transferring each fixed length packet to its corresponding destination node.

* * * * *